(12) United States Patent
Iwata et al.

(10) Patent No.: US 6,732,621 B2  
(45) Date of Patent: May 11, 2004

(54) METHOD FOR MACHINING SLOTS IN MOLDING DIE

(75) Inventors: Naoto Iwata, Oobu (JP); Masayoshi Fujita, Tokai (JP); Masahiko Natume, Kariya (JP); Yoshiaki Mizuno, Nagoya (JP); Mitsutoshi Miyazaki, Nagoya (JP); Toshiji Kondou, Handa (JP)

(73) Assignee: Denso Corporation, Kariya (JP)

( * ) Notice: Subject to any disclaimer, the term of this patent is extended or adjusted under 35 U.S.C. 154(b) by 364 days.

(21) Appl. No.: 09/903,494

(22) Filed: Jul. 13, 2001

(65) Prior Publication Data

US 2001/0045366 A1 Nov. 29, 2001

Related U.S. Application Data

(62) Division of application No. 09/092,646, filed on Jun. 9, 1998, now Pat. No. 6,290,837.

(30) Foreign Application Priority Data

Jun. 9, 1997 (JP) .............................. 9-168072  
Jun. 9, 1997 (JP) .............................. 9-168073  
Jun. 9, 1997 (JP) .............................. 9-168074  
Jul. 4, 1997 (JP) .............................. 9-195192  
Apr. 24, 1998 (JP) ............................ 10-131449

(51) Int. Cl.[7] ................................. B29D 3/00  
(52) U.S. Cl. .................... 83/51; 29/557; 29/558; 83/875  
(58) Field of Search .................. 205/661, 665; 219/69.17, 129.6; 83/51, 875; 29/558, 557

(56) References Cited

U.S. PATENT DOCUMENTS

| | | | |
|---|---|---|---|
| 4,640,454 A | 2/1987 | Yamamoto | |
| 5,507,925 A | 4/1996 | Brew | |
| 5,630,951 A | 5/1997 | Peters | |
| 5,728,286 A | 3/1998 | Suzuki et al. | |
| 5,865,983 A | 2/1999 | Seely | |

FOREIGN PATENT DOCUMENTS

| | | |
|---|---|---|
| JP | 5682150 | 7/1981 |
| JP | 58217308 | 12/1983 |
| JP | 6343030 | 2/1988 |
| JP | 434931 | 2/1992 |
| JP | 4179503 | 6/1992 |
| JP | 5226305 | 9/1993 |
| JP | 71277 | 1/1995 |
| JP | 740149 | 2/1995 |
| JP | 7256511 | 10/1995 |

*Primary Examiner*—Allan R. Kuhns  
(74) *Attorney, Agent, or Firm*—Oliff & Berridge, PLC

(57) ABSTRACT

An improved method of machining slots and material feed holes in a molding die such as an extrusion die designed to form a honeycomb structure of ceramics employed as a catalyst carrier of a catalytic converter for automotive vehicles. In one of the preferred embodiments, shallow holes are drilled in a die material and subjected to electrochemical machining to remove material from the bottoms of the shallow holes so that they communicate with the material feed holes without any burrs. In the other embodiment, the slots are cut using a rotary cutter in a given order which will balance reaction forces exerted on the cutter from both side walls of each slot to minimize deformation of the cutter during cutting of the slots, thereby preventing the slots from being curved undesirably.

17 Claims, 17 Drawing Sheets

METHOD FOR MACHINING SLOTS IN MOLDING DIE

This Application is a Divisional of, and claims priority from, U.S. patent application Ser. No. 09/092,646, filed Jun. 9, 1998, now U.S. Pat. No. 6,290,837.

BACKGROUND OF THE INVENTION

1. Technical Field of the Invention

The present invention relates generally to a method of cutting slots in a hard material, and more particularly to an improved method of machining slots and material feed holes in a die for molding a honeycomb structure, for example.

2. Background of Related Art

U.S. Pat. No. 4,640,454 to Yamamoto et al. teaches an extrusion die for making honeycomb structures of ceramics used as a catalyst carrier of a catalytic converter for automotive vehicles.

Such honeycomb structures have thin honeycomb walls of the order of 100 $\mu$m. The extrusion die, thus, needs to have formed therein slots whose width is of the order of 105 to 110 $\mu$m and material feed holes communicating with the slots. Usually, the slots are cut using a disc-shaped rotary cutter having a thickness of 100 $\mu$m, and the material feed holes are drilled.

The conventional die machining techniques, however, have encountered the drawbacks in that the drilling of the material feed holes causes burrs to occur at portions of the holes communicating with the slots, thereby resulting in defects in the honeycomb structures and in that the cutter is deformed or shifted out of a preselected cutting path during cutting of each slot because of thinness thereof, thereby resulting in the curved slots.

SUMMARY OF THE INVENTION

It is therefore a principal object of the present invention to avoid the disadvantages of the prior art.

It is another object of the present invention to provide an improved method of machining straight slots and holes communicating with the slots in a die without any defects.

According to one aspect of the present invention, there is provided a method of making a molding die comprising the steps of: (a) preparing a die material having a slot-forming surface and a molding material feed hole-forming surface opposite the slot-forming surface; (b) machining a slot in the slot-forming surface of the die material; (c) machining a shallow hole in the shallow hole-forming surface of the die material, the molding material feed hole having a depth shorter than a molding material feed hole; and (d) forming the molding material feed hole by subjecting a bottom of the shallow hole to non-contact machining to establish physical communication between the slot and the shallow hole.

In the preferred mode of the invention, the non-contact machining is one of electrochemical machining, electric discharge machining, and laser beam machining.

The shallow hole is 0.05 to 2.0 mm shorter in depth than the molding material feed hole.

The molding die is designed to make a honeycomb structure.

According to the second aspect of the invention, there is provided a method of making a molding die comprising the steps of: (a) preparing a die material having a slot-forming surface and a molding material feed hole-forming surface opposite the slot-forming surface; (b) machining a molding material feed hole in the molding material feed hole-forming surface of the die material; (c) mounting the die material on a work table of a grooving machine with the molding material feed hole-forming surface exposed to a vacuum chamber provided in the work table; and (d) machining a slot, which communicates with the molding material feed hole, in the slot-forming surface of the die material using a rotary disc-shaped cutter having a thickness of 150 $\mu$m or less while decreasing an internal pressure of the vacuum chamber of the grooving machine.

In the preferred mode of the invention, the molding die is designed to make a honeycomb structure.

According to the third aspect of the invention, there is provided a method of making a molding die comprising the steps of: (a) preparing a die material having a slot-forming surface and a molding material feed hole-forming surface opposite the slot-forming surface; (b) machining molding material feed holes in the molding material feed hole-forming surface of the die material; (c) mounting the die material on a work table of a grooving machine with the molding material feed hole-forming surface exposed to a vacuum chamber provided in the work table; and (d) machining slots, which communicate with the molding material feed holed, in the slot-forming surface of the die material using a rotary disc-shaped cutter having a thickness of 150 $\mu$m or less while decreasing an internal pressure of the vacuum chamber of the grooving machine, the machining step including a masking step of masking at least part of the slots which have already been machined during machining the slots.

In the preferred mode of the invention, the molding die is designed to make a honeycomb structure.

According to the fourth aspect of the invention, there is provided a method of making a molding die comprising the steps of: (a) preparing a die material, the die material having a slot-forming surface and a molding material feed hole-forming surface opposite the slot-forming surface, the slot-forming surface having formed on an end thereof a tapered portion; (b) machining a molding material feed hole in the molding material feed hole-forming surface of the die material; and (c) machining a slot, which communicates with the molding material feed hole, in the slot-forming surface of the die material toward the tapered portion using a disc-shaped cutter having a thickness of 150 $\mu$m or less so that the cutter may leave the tapered portion at completion of machining the slot.

In the preferred mode of the invention, the tapered portion of the slot-forming surface of the die material is so formed that the thickness of the tapered portion is continuously decreased.

The tapered portion of the slot-forming surface is inclined at an angle of 18° or less to a reference surface extending in parallel to the slot.

The tapered portion may alternatively be curved.

The tapered portion of the slot-forming surface of the die material may alternatively be so formed that the thickness of the tapered portion is decreased stepwise.

The molding die is designed to make a honeycomb structure.

According to the fifth aspect of the invention, there is provided a method of making a molding die comprising the steps of: (a) preparing a die material having a slot-forming surface and a molding material feed hole-forming surface opposite the slot-forming surface; (b) machining molding material feed holes in the molding material feed hole-forming surface of the die material; and (c) machining slots which communicate with the molding material feed holes in the slot-forming surface of the die material in sequence at regular pitches using a rotary cutter having a thickness 150 μm or less, each of the slots being formed at an interval two times the regular pitch or more away from immediately preceding one of the slots.

In the preferred mode of the invention, the interval is 2.0 mm or more.

Each of the slot is cut close to a line which divides an machined portion of the slot-forming surface into two equal parts.

A step is further provided which monitors the breakage of the rotary cutter during machining of the slots to determine whether the cutter has reached a service life thereof or not.

The cutter damage monitoring step determines the number of breakages, the depth of each breakage, and the width of each breakage and compares them with reference values in determining whether the cutter has reached the service life or not.

The reference values of the number of breakage, the depth of each breakage, and the width of each breakage is 1, 0.5 mm, and 0.5 mm, respectively.

The molding die is designed to make a honeycomb structure.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

The present invention is directed to an improved method of machining thin grooves or slots in a hard material and a production method of a molding die having formed therein slots which may be employed in extrusion or injection molding using ceramic or resin materials.

The first embodiment of the invention will be discussed below, taking as an example a production method of an extrusion die for making a ceramic honeycomb structure such as a catalyst carrier used in a catalytic converter for automotive vehicles.

Figure 9:
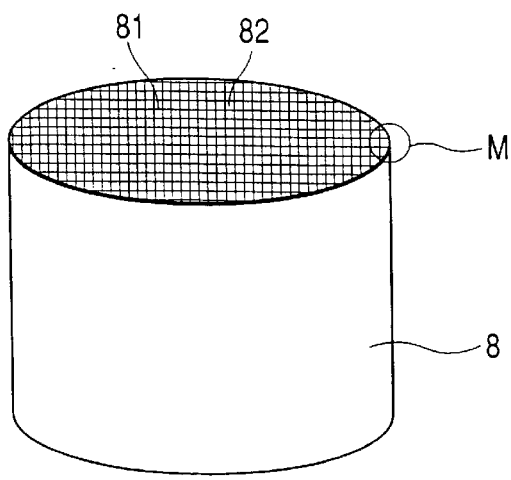
FIG. 9 is a perspective view which shows a honeycomb structure made by the extrusion die in FIGS. 1 and 2.

FIGS. 1 to 4 show an extrusion die 1 for making a honeycomb structure 8, as shown in FIG. 9. The extrusion die 1 has formed therein latticed slits or slots 2 communicating with material feed holes 4. In extrusion molding, a ceramic material is first forced into the feed holes 4 of the extrusion die 1 by a conventional extruder. The ceramic material enters the slots 2 and spreads therein in a honeycomb form. The honeycombed material is extruded out of the slots 2 and a circular opening 18 of a mask die 19 and shaped into the honeycomb structure 8.

Production steps of the extrusion die 1 will be discussed below.

Figure 5A:
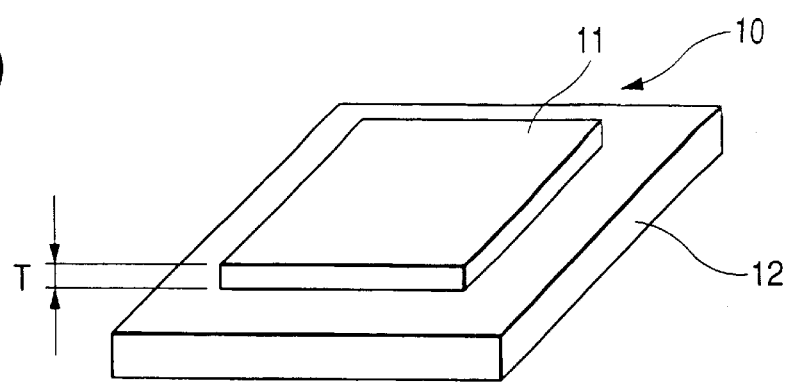
FIGS. 5(a), 5(b), and 5(c) are perspective views which show processes of making an extrusion die.
Figure 5B:
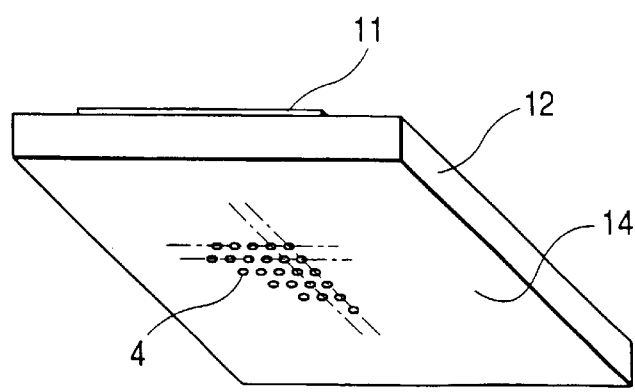

First, an SKD61-steel plate 10, as shown in FIG. 5(a), is prepared which is machined to form a flat bottom 14, as shown in FIG. 5(b), and a square stepped portion 11, which will be referred to as a slot forming wall, on an upper surface of a base 12. The slot forming wall 11 has a thickness T of 2.7 mm.

Figure 1:
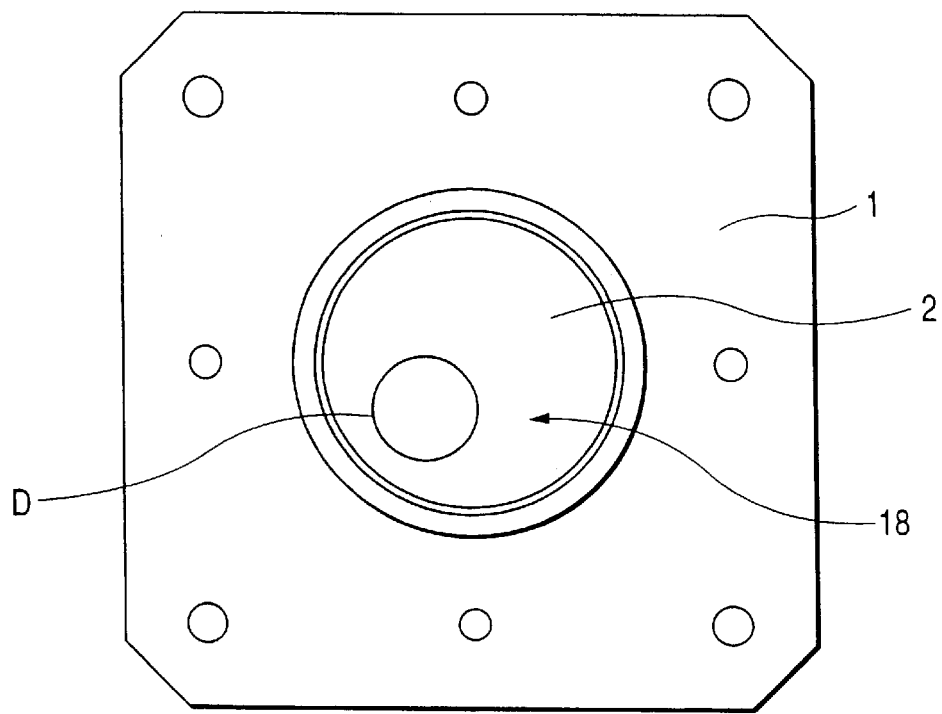
FIG. 1 is a plan view which shows an extrusion die for making a ceramic honeycomb structure.
Figure 2:
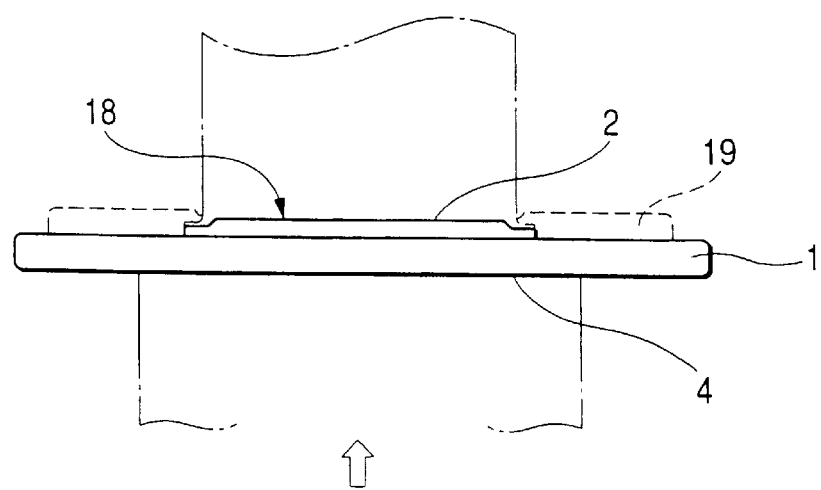
FIG. 2 is a front view which shows the extrusion die of FIG. 1.
Figure 3:
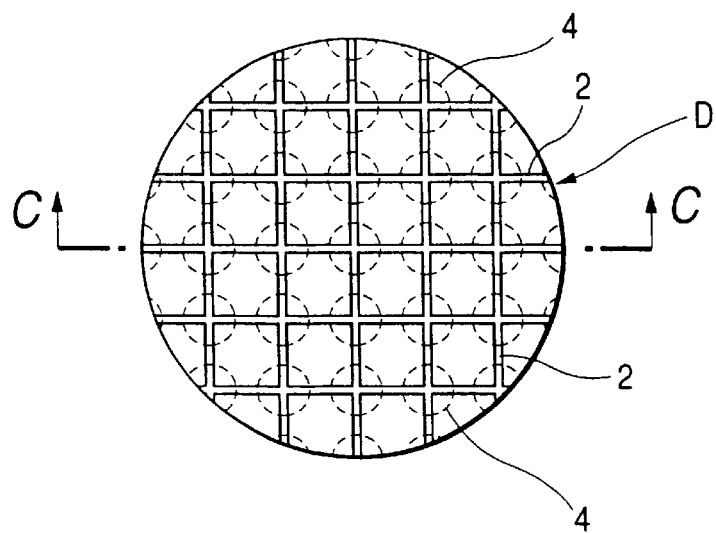
FIG. 3 is an enlarged view of a portion as indicated by "D" in FIG. 1.
Figure 6:
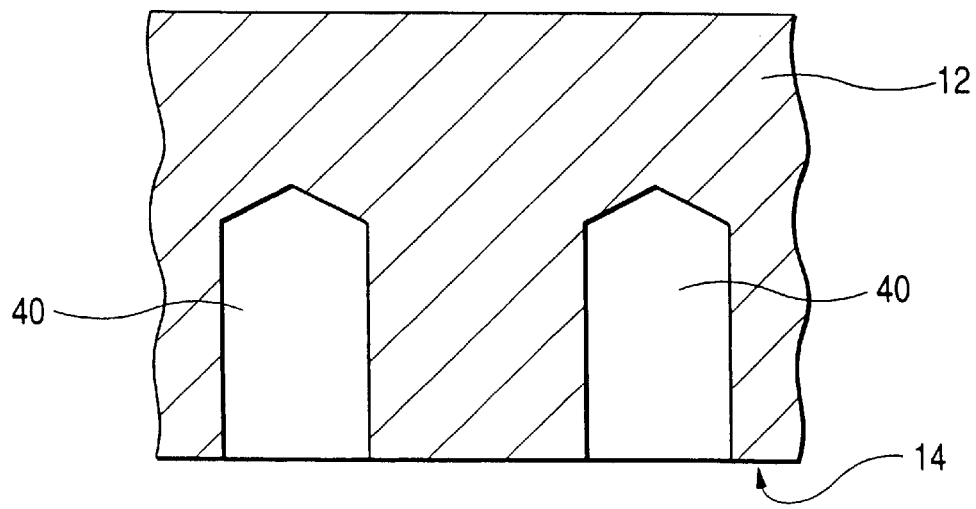
FIG. 6 is a cross sectional view which shows shallow holes formed in a die plate.
Figure 7:
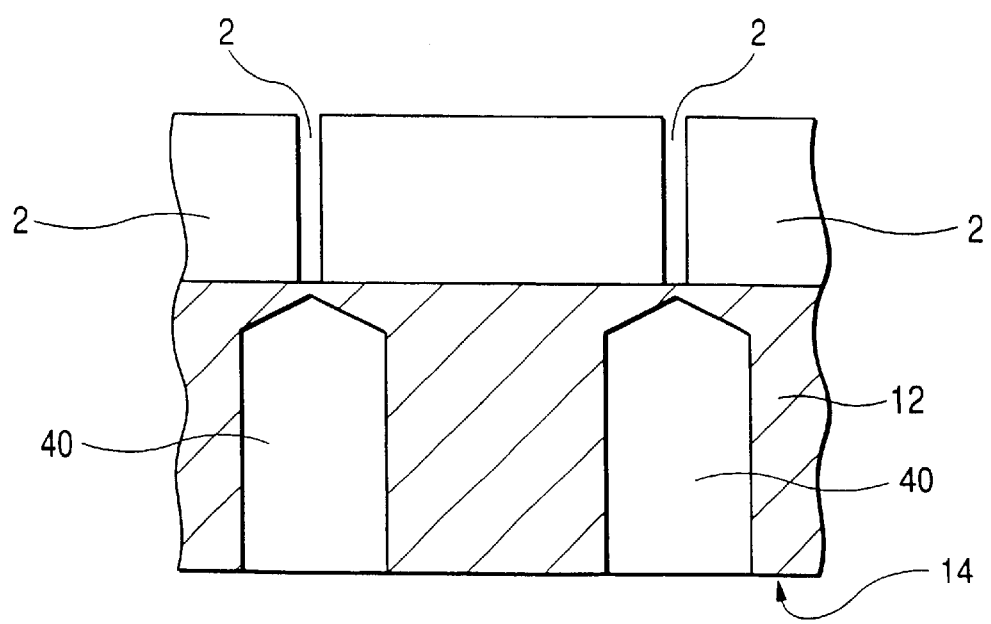
FIG. 7 is a cross sectional view which shows slots cut above the shallow holes shown in FIG. 6.

Next, shallow holes 40 are, as shown in FIG. 6, drilled in the flat bottom 14 in a matrix arrangement to a preselected depth shorter than that of the feed holes 4 by, for example, 1.0 mm. The difference in effective depth between the shallow holes 40 and the feed holes 4 may be any value within a range from 0.05 to 2.0 mm. The shallow holes 40 have a diameter of 1 mm and are, as shown in FIGS. 3 and 7, formed so that they may be in alignment with intersections of the slots 2, respectively.

Figure 5C:
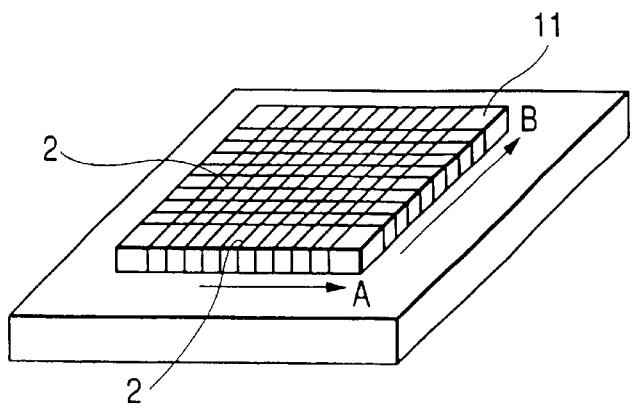
Figure 8:
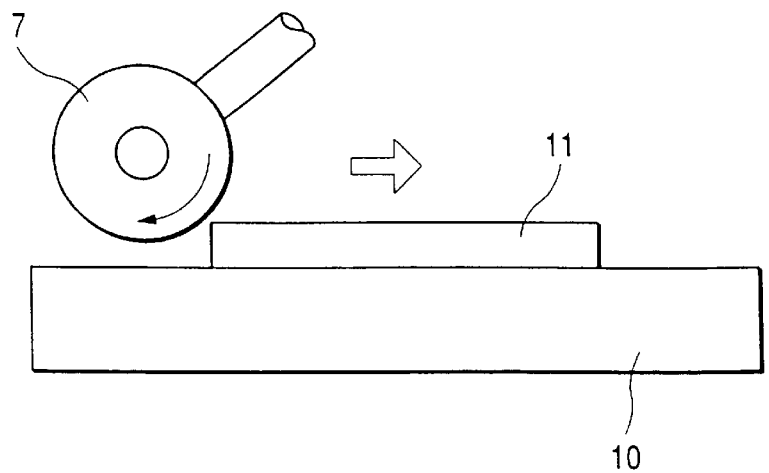
FIG. 8 is an illustration which shows a process of cutting slots in a die plate.

The slots 2 are, as shown in FIG. 5(c), cut in the slot forming wall 11 in a matrix arrangement. The formation of each slot 2 is achieved, as shown in FIG. 8, by rotating and making a disc-shaped cutter 7 cut into the slot forming wall 11 of the steel plate 10 mounted on a work table in a direction indicated by an arrow A or B in FIG. 5(c). The depth of cut is approximately 2.4 mm so that each slot 2 will not communicate with the shallow holes 40, as clearly shown in FIG. 7. This allows the slots 2 to be formed straight without influence of the shallow holes 40. The cutter 7 is made of abrasive grain such as diamond powder or CBN carbon boron nitride) powder hardened using binder.

Figure 10:
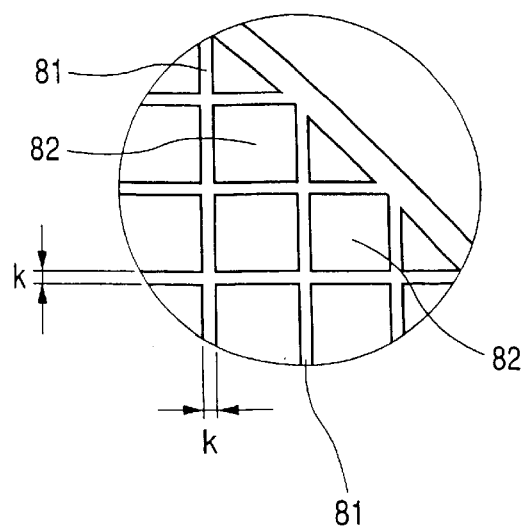
FIG. 10 is an enlarged view of a portion indicated by "M" in FIG. 9.

The extrusion die 1 is, as described above, used to make the honeycomb structure 8, as shown in FIGS. 9 and 10, which has formed therein a plurality of cells 82 defined by cell walls 81 each having a thickness k of 100 $\mu$m, for example. Each slot 2, thus, needs to be cut to have a width of 105 to 110 $\mu$m using the cutter 7 having a thickness of 100 $\mu$m.

Figure 11:
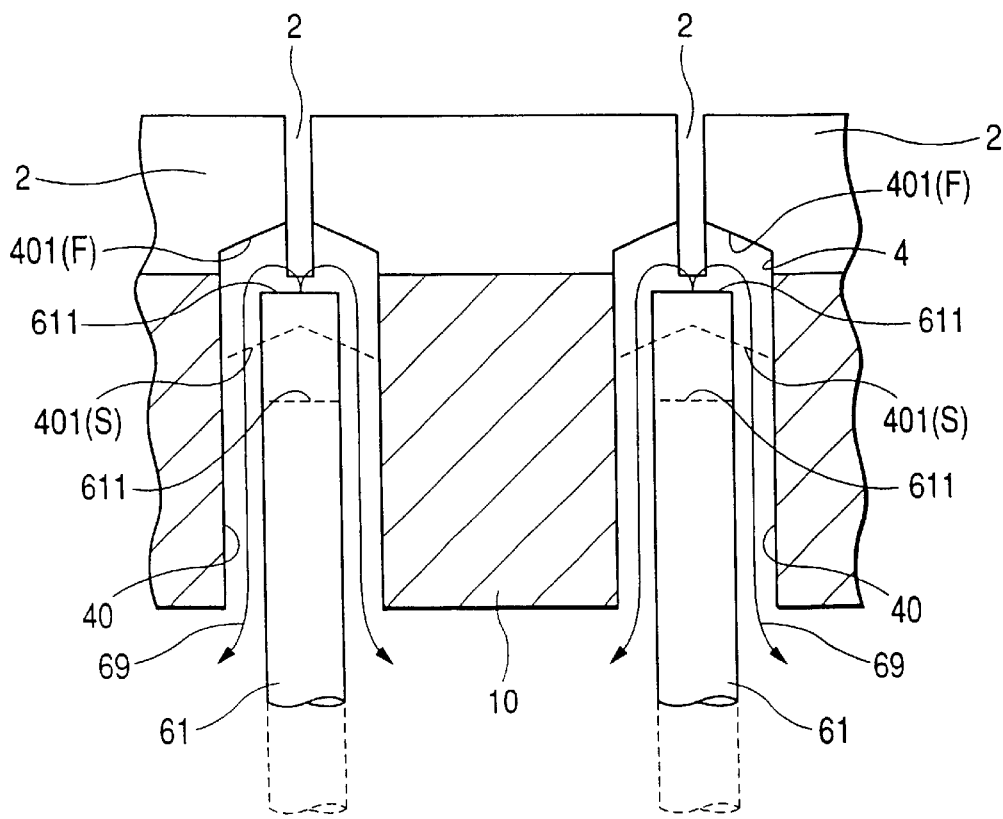
FIG. 11 is a cross sectional view which shows a process of electrochemical machining to remove material from the bottom, of each shallow slot shown in FIG. 6.

Next the bottom portions of the shallow holes 40 are, as shown FIG. 11, subjected to electrochemical machining in the following manner.

First, pipe electrodes 61 are prepared which have a diameter smaller than that of the shallow holes 40. Each of the pipe electrodes 61 is made of a tungsten pipe which is coated with teflon and has formed in a top 611 thereof a hole for spraying electrolytic solution 69.

Each of the pipe electrodes 61 is inserted into one of the shallow holes 40 with a constant clearance between the top 611 and the bottom 401 of the shallow hole 40. The voltage is applied across the pipe electrodes 61 and the steel plate 10. The electrolytic solution 69 is jet out of the pipe electrodes 61 toward the bottoms 401 of the shallow holes 40. This causes the bottoms 401 of the shallow holes 40 to be removed gradually, so that the bottoms 401 proceed from (S) to (F). Specifically, the depth of each of the shallow holes 40 is increased from a broken line to a solid line so that the shallow holes 40 communicate with the slots 2, respectively. The pipe electrodes 61 are moved upward, as shown in FIG. 11, as the bottoms 401 of the shallow holes 40 are removed.

This embodiment uses an NaCl aqueous solution (or an NaNO$_3$ aqueous solution) as the electrolytic solution 69. Chemical reactions to the steel plate 10 are Anode:

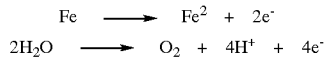

$$2H_2O \longrightarrow O_2 + 4H^+ + 4e^-$$

Cathode:

$$O_2 + 4H^+ + 4e^- \longrightarrow 2H_2O$$

$$2H_2O + 2e^- \longrightarrow H_2 + 2OH^-$$

In the above manner, the shallow holes 40 are finished to the feed holes 4 communicating with the slots 2 without any burrs at the intersections of the feed holes and the slots 2.

Figure 12:
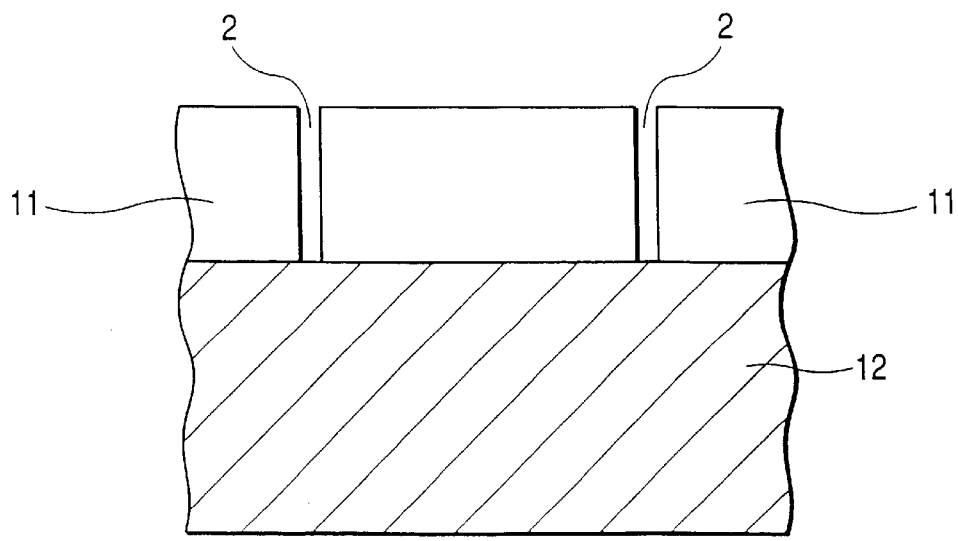
FIG. 12 is a cross sectional view which shows a modification of a die production method of the first embodiment.
Figure 13:
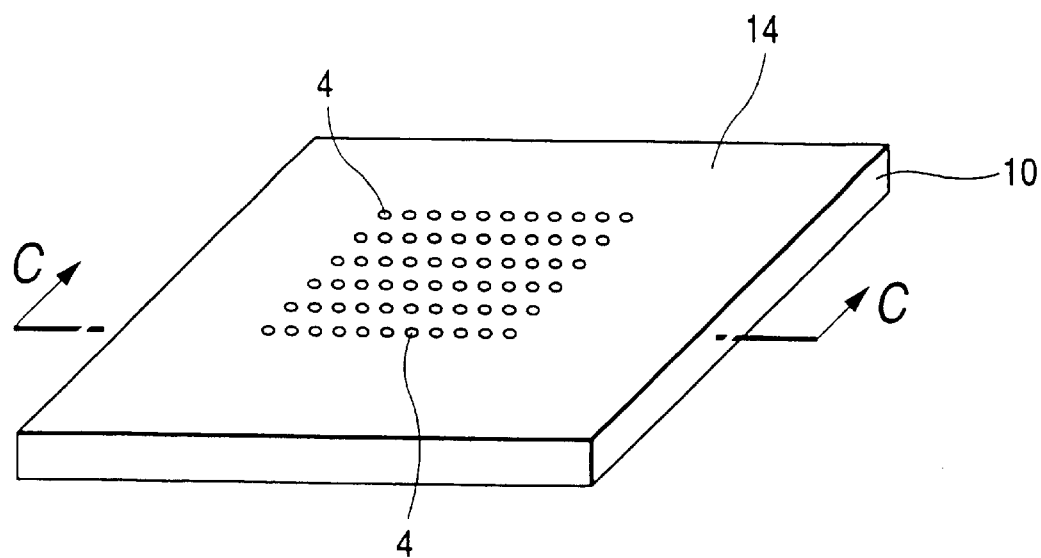
FIG. 13 is a perspective view which shows a die plate in which material feed holes are drilled in a die production method according to the second embodiment of the invention.

The machining processes of the shallow holes 40 and the slots 2 may alternatively be reversed. Specifically, the slots 2, as shown in FIG. 12, are first cut in the slot forming wall 11 in a matrix arrangement, after which the shallow holes 40 are drilled in the base 12. Finally, the electrochemical machining is performed in the same manner as described above to establish the communication between the shallow holes 40 and the slots 2.

The finishing of the shallow holes 40 to communicate with the slots 2 may alternatively be achieved by electric discharge machining, laser beam machining, or any other similar machining techniques.

The shallow holes 40 are, as shown in FIG. 7, drilled to the depth which does not communicate with the bottoms of the slots 2, however, they may be drilled to the depth in which the bottom of each shallow hole 40 laps into the slots 2 to a certain extent unless unwanted burrs occur. In the case where the diameter of the shallow holes 40 is, as described above, 1 mm, the shallow holes 40 may be drilled to the depth in which the bottoms of the shallow holes 40 lap into the slots 2 by 0.2 mm or less.

An extrusion die production method according to the second embodiment of the invention will be discussed below with reference to FIGS. 13 to 17.

First, the steel plate 10 identical with the one in the above first embodiment is prepared.

Figure 14:
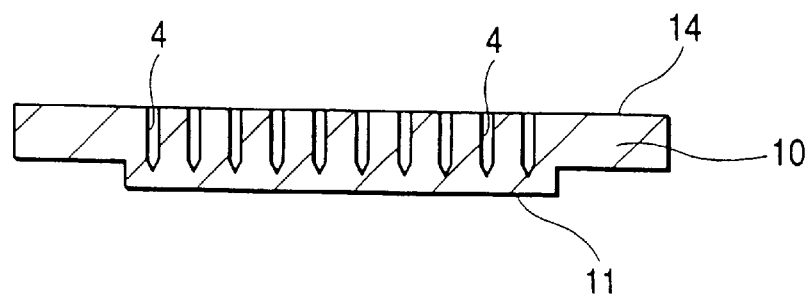
FIG. 14 is a cross sectional view taken along the line C—C in FIG. 13.

The feed holes 4 having a diameter of 1 mm are drilled in the flat bottom 14 of the steel plate 10 in a matrix arrangement to the depth in which the bottom of each feed hole 4 enters, as shown in FIG. 14, the bottom of the slot forming wall 11.

Figure 15:
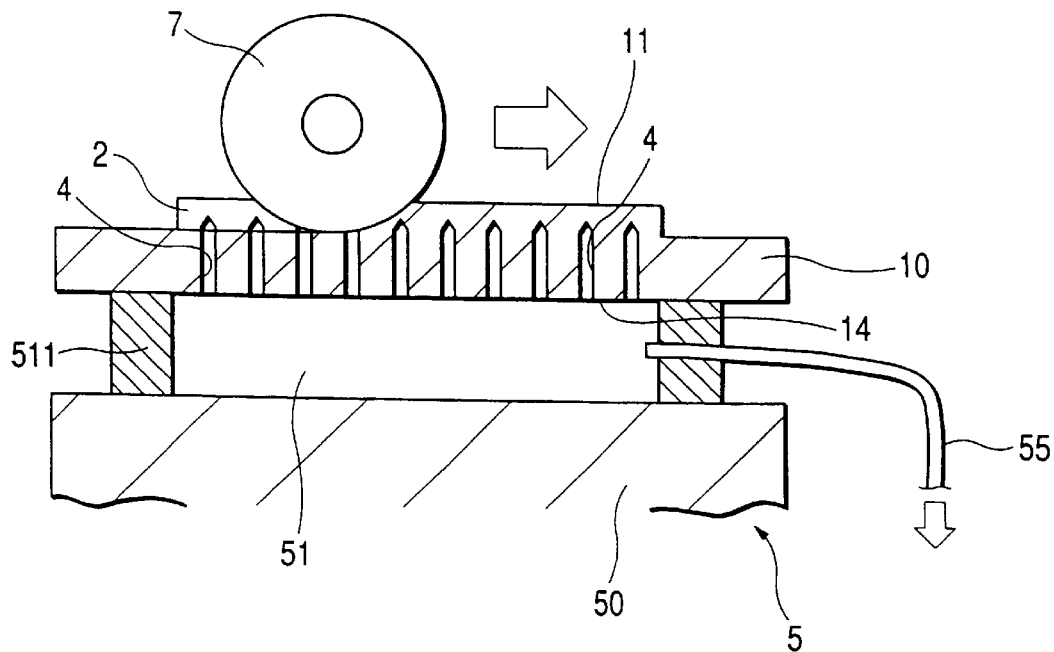
FIG. 15 is a cross sectional view which shows a process of cutting slots in a die plate.

Next, the steel plate 10 is, as shown in FIG. 15, mounted on a rectangular frame 511 installed on a base 50 of a work table 5 so that all the feed holes 4 may be exposed to a vacuum chamber 51.

The vacuum chamber 51 is connected to a vacuum pump (not shown) through a pipe 55 and kept at a given low pressure level.

Figure 16:
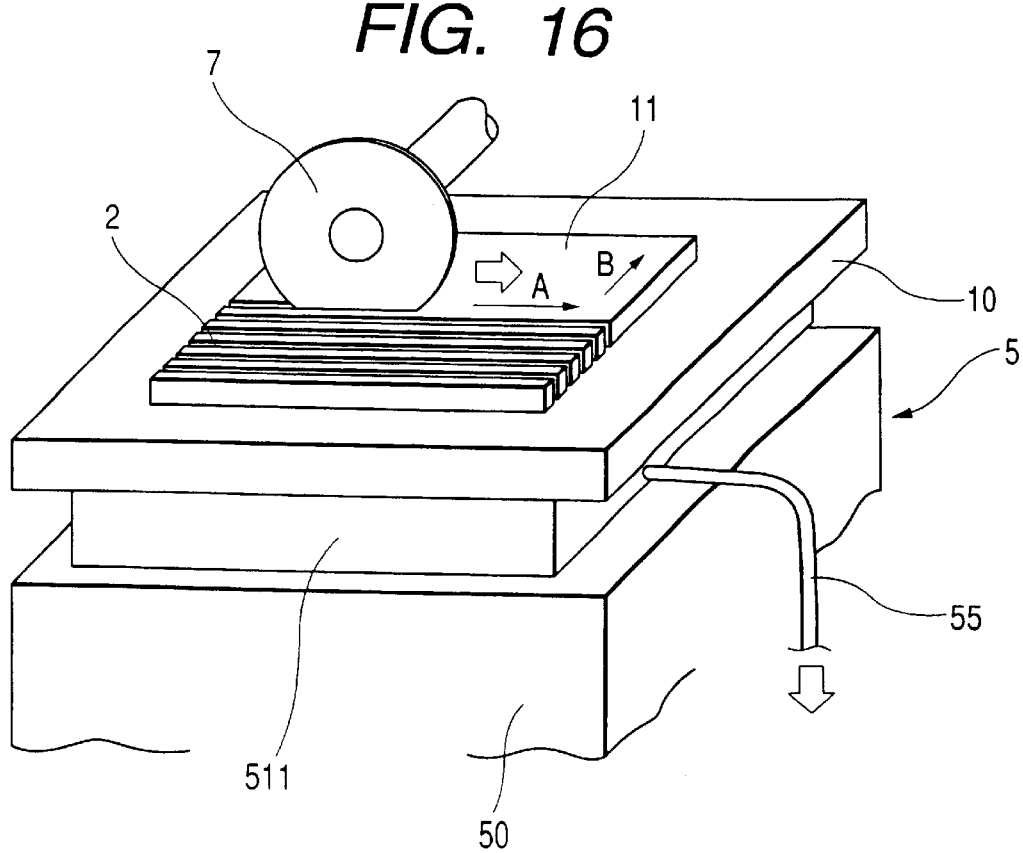
FIG. 16 is a perspective view which shows a process of cutting slots in a die plate.

Finally, the slots 2 are cut in the slot forming wall 11, as shown in FIGS. 15 and 16, to the depth communicating with the feed holes 4 by means of the disc-shaped cutter 7 having a thickness of 150 $\mu$m or less in the same manner as that in the first embodiment. Specifically, a given number of the horizontal slots 2 are formed along linear arrays of the feed holes 4 arranged in the direction A, after which a given number of the vertical slots 2 are formed along linear arrays of the feed holes 4 arranged in the direction B.

Figure 17:
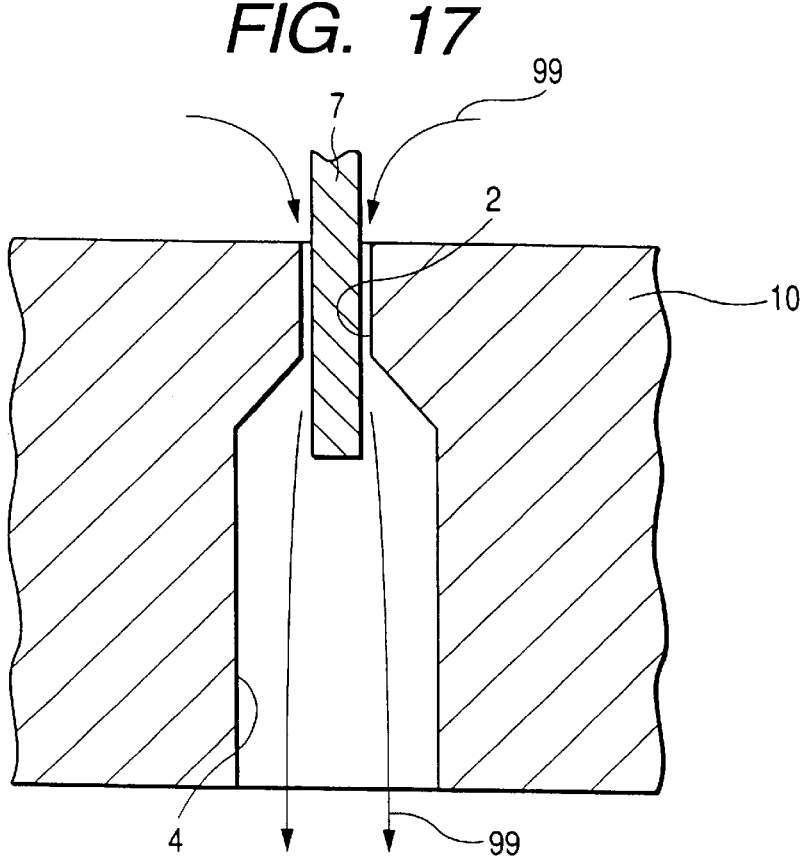
FIG. 17 is a partially cross sectional view which shows a process of cutting a slot communicating with a material feed hole drilled in a die plate.

When the cutter 7 enters one of the feed holes 4 as shown in FIG. 17, it will cause air flow 99 to be created toward the vacuum chamber 51, thereby discharging debris or chips collected in the slot 2 to the vacuum chamber 51 through the feed hole 4.

The air flow 99 also serves to suck a cutting fluid into the slots 4 widely, thereby facilitating ease of the cutting and protecting the cutter 7 from thermal damage.

After the slots 2 are all formed, the slot forming wall 11 of the steel plate 10 is machined into a circular form corresponding to the honeycomb structure 8 to complete the extrusion die 1.

Figure 18:
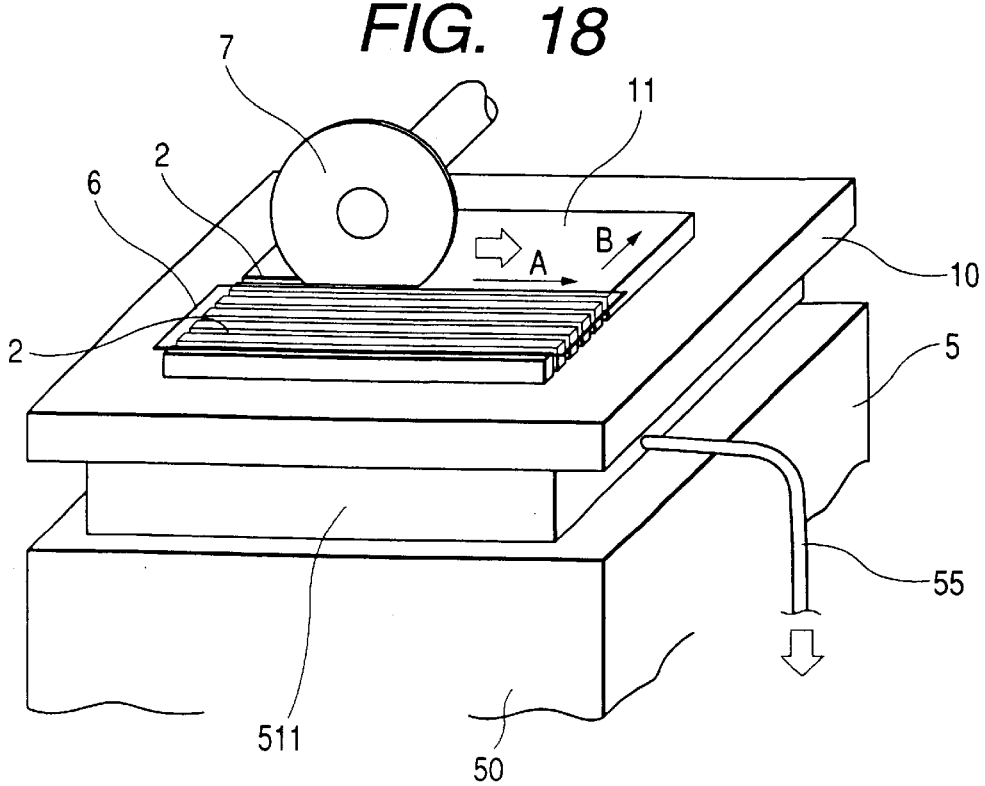
FIG. 18 is a perspective view which shows a process of cutting slots according to the third embodiment of the invention.
Figures 19A, 19B:
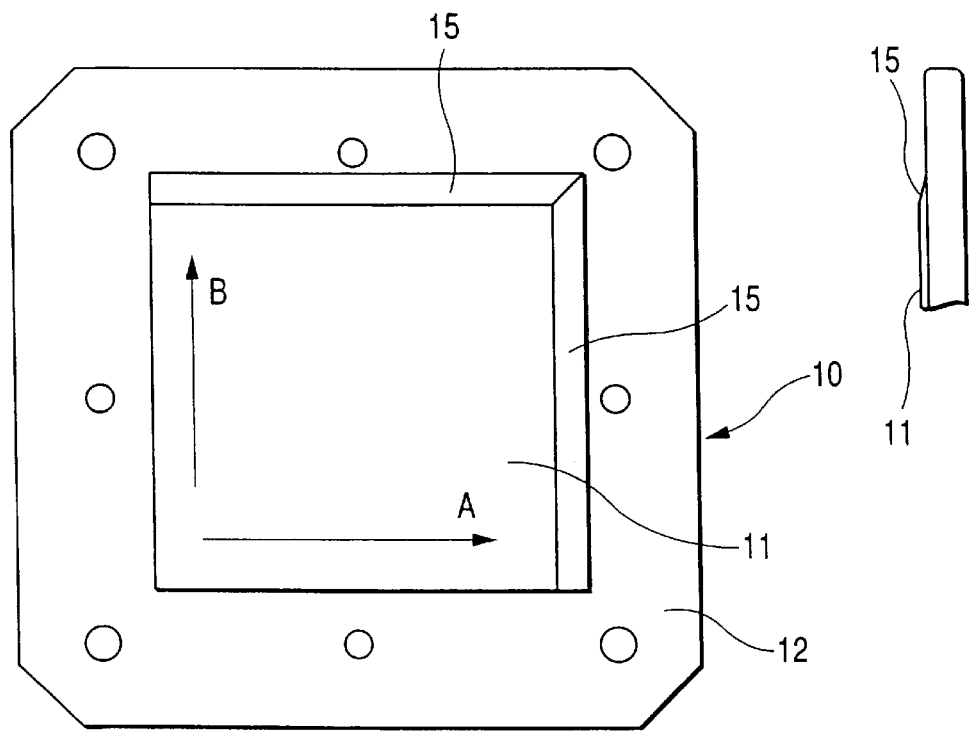
FIG. 19(a) is a plan view which shows a die plate according to the fourth embodiment of the invention.
FIG. 19(b) is a partial side view of FIG. 19(a)
Figure 19C:
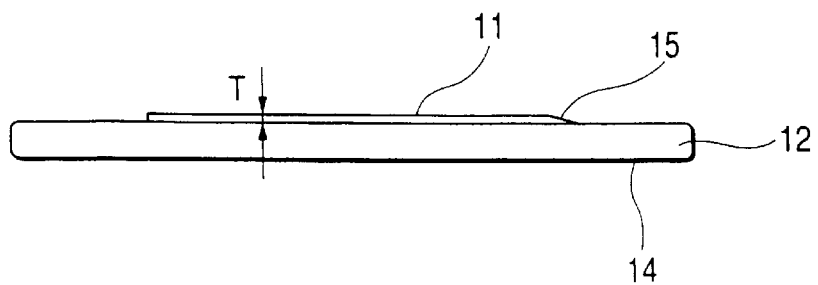
FIG. 19(c) is a front view of FIG. 19(a)

FIG. 18 illustrates an extrusion die production method according to the third embodiment of the invention which is different from the second embodiment only in using a masking film 6 during cutting of the slots 2.

Specifically, after a preselected number of slots 2 are cut, the making film 6 is placed on them to interrupt the air flow 99, as shown in FIG. 17. Subsequently, a preselected number of slots 2 are further cut, and the making film 6 is shifted toward the slots 2 which have been cut now. These operations are repeated until a required number of slots 2 are all formed.

The interruption of the air flow 99 through the masking film 6 prevents the cutting fluid from being sucked more than required into the vacuum chamber 51.

An extrusion die production method according to the fourth embodiment of the invention will be discussed below with reference to FIGS. 19(a) to 22.

First, the SKD61-steel plate 10 is prepared which has two adjacent sides 15 of the slot forming wall 11 chamfered or tapered at an angle of 10° to 18° to a reference surface of the base 12 (e.g., the upper surface) which extends parallel to the slots 2. Other parts are identical with those of the steel plate 10 of the first to third embodiments.

Next, the feed holes 4 having a diameter of 1 mm are drilled in the flat bottom 14 of the steel plate 10 in a matrix arrangement 100×100 to the depth in which the bottom of each feed hole 4 enters the bottom of the slot forming wall 11 in the same manner as that of the second and third embodiments.

Figure 20:
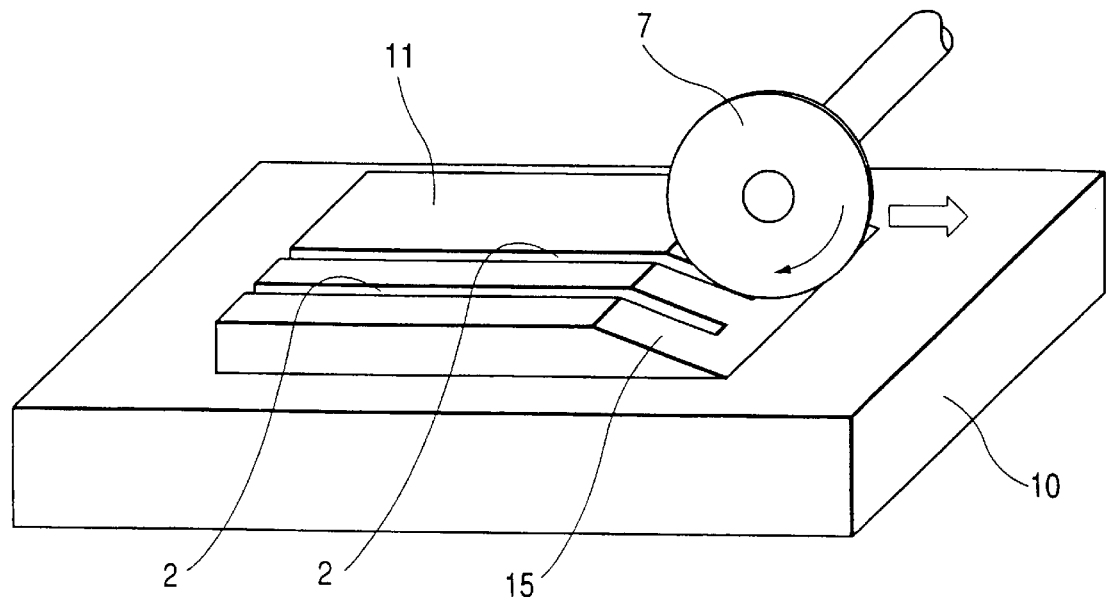
FIG. 20 is a perspective view which shows a process of cutting slots in a die plate.
Figure 21:
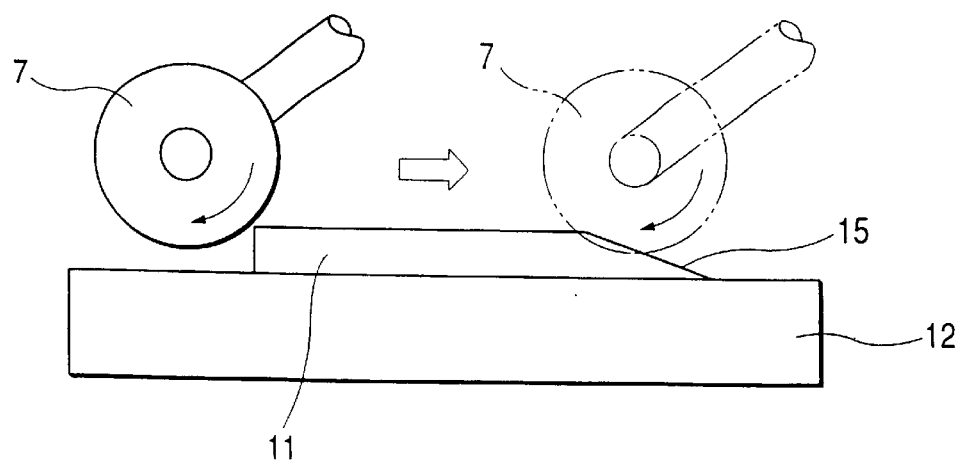
FIG. 21 is an illustration which shows the direction in which a cutter moves to cut slots in a die plate.
Figure 22:
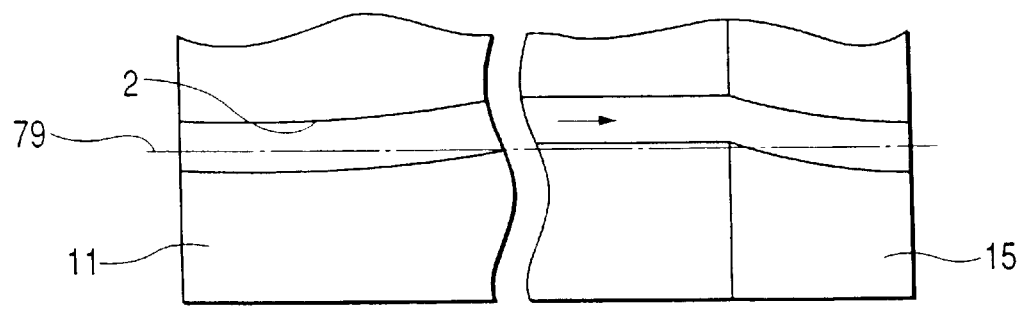
FIG. 22 is an illustration which shows a slot curved due to deformation of a cutter.

The slots 2 are cut in the slot forming wall 11, as shown in FIGS. 20 to 22, to the depth (e.g., 2.4 mm) communicating with the feed holes 4 by means of the disc-shaped cutter 7 having a thickness of 150 μm or less in the same manner as that in the second and third embodiments. Specifically, the cutter 7 is moved toward the right one of the tapered surfaces 15, as viewed in FIG. 19(a), to cut a given number of horizontal slots 2 along linear arrays of the feed holes 4 arranged in the direction A, after which the cutter 7 is moved toward the upper one of the tapered surface 15 to cut a given number of vertical slots 2 along linear arrays of the feed holes 4 arranged in the direction B.

The cutter 7 is extremely thin (150 μm or less) and thus deformed or shifted, as shown in FIG. 22, out of a required cutting path 79 (i.e., a travel path of a cutter holder) during cutting of each slot 2. The shift of the cutter 7 is, however, corrected gradually after the cutter 7 reaches the tapered surface 15, as shown in FIG. 22. This is because the tapered surface 15 decreases in thickness gradually, so that the stress causing the deformation of the cutter 7 is reduced as the cutter 7 proceeds to the end of the tapered surface 15. This eliminates a mechanical shock causing damage to the cutter 7 produced when the cutter 7 leaves the end of the tapered surface 15.

Finally, the periphery of the slot forming wall 11 of the steel plate 10 is machined into an arc-shaped portion to remove the tapered surfaces 15.

Figure 23:
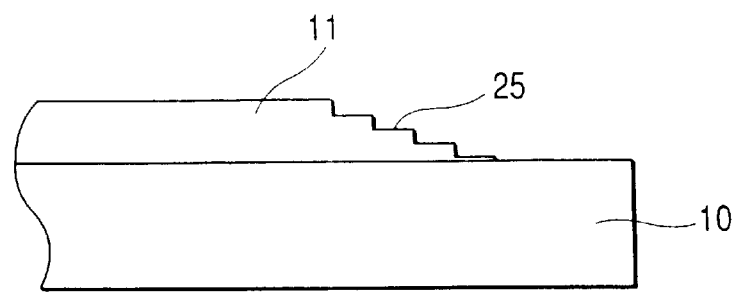
FIG. 23 is an illustration which shows a first modification of the third embodiment of the invention.
Figure 24:
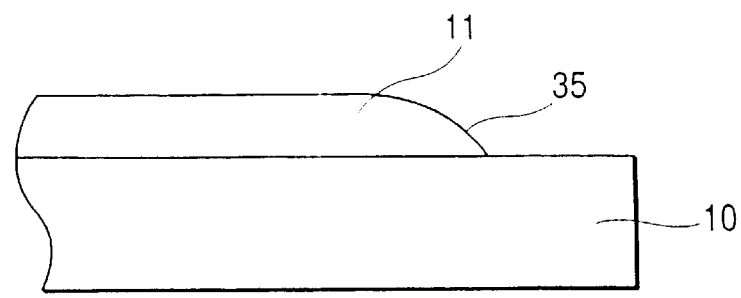
FIG. 24 is an illustration which shows a second modification of the third embodiment of the invention.

FIGS. 23 and 24 show modifications of the fourth embodiment.

In FIG. 23, a plurality of steps 25 are formed from the upper surface to the bottom of each of two adjacent side portions of the slot forming wall 11 of the steel plate 10.

In FIG. 24, two adjacent side portions of the slot forming wall 11 are rounded as indicated at numeral 35.

An extrusion die production method according to the fifth embodiment of the invention will be discussed below with reference to FIGS. 25(a) to 27.

First, the SKD61-steel plate 10 is prepared which is identical with the one in the above first to third embodiment is prepared.

Next, the feed holes 4 having a diameter of 1 mm are drilled in the flat bottom 14 of the steel plate 10 in a matrix arrangement in the same manner as that of the second and third embodiments.

Figure 4:
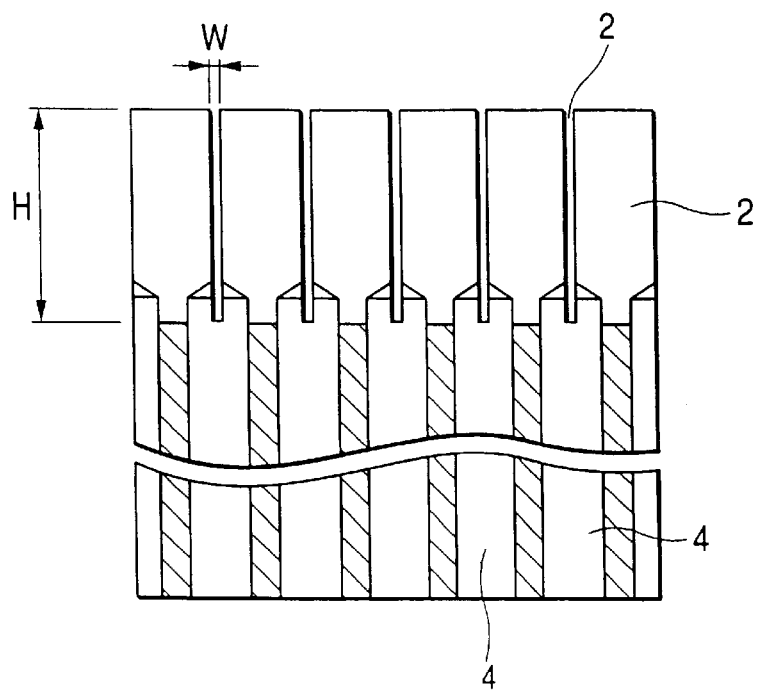
FIG. 4 is a cross sectional view taken along the line C—C in FIG. 3.
Figures 25A, 25B:
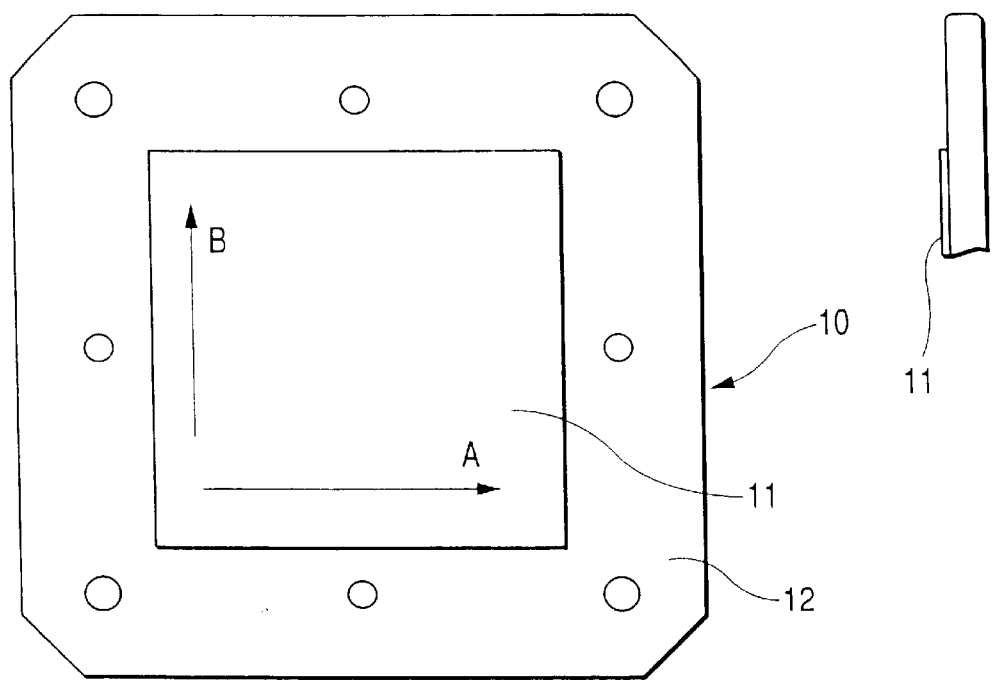
FIG. 25(a) is a plan view which shows a die plate according to the fifth embodiment of the invention.
FIG. 25(b) is a partial side view of FIG. 25(a)
Figure 25C:
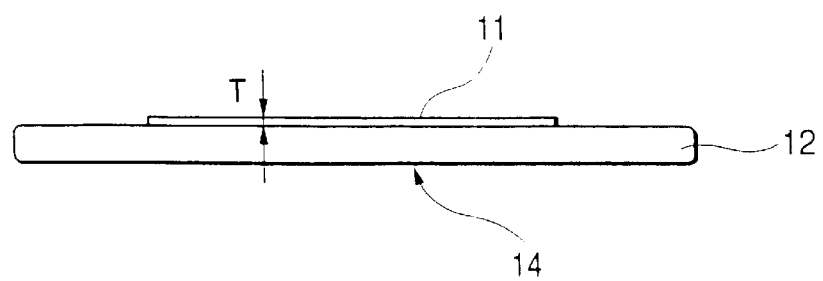
FIG. 25(c) is a front view of FIG. 25(a)
Figure 26:
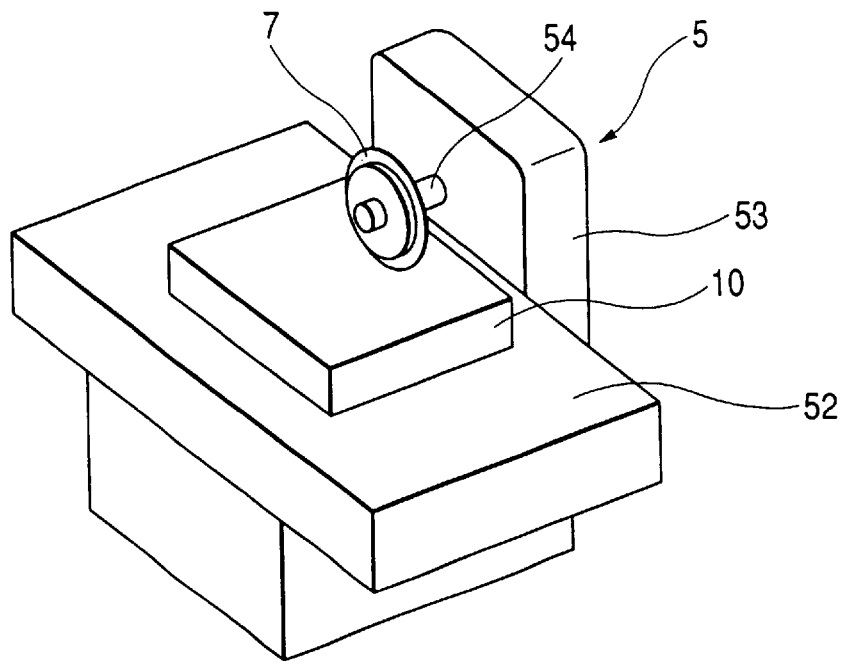
FIG. 26 is a perspective view which shows a grooving machine.

The slots 2 are cut in the slot forming wall 11 of the steel plate 10 in directions A and B, as shown in FIG. 25(a), in a matrix arrangement of 100×100 using a grooving machine 5 shown in FIG. 26. The width W of each slot 2, as shown in FIG. 4, is 105 to 110 μm. The depth H of each slot 2 is ten times the width W or more.

The grooving machining 5 includes a work table 52 and a tool supporter 53. The tool supporter 53 holds the cutter 7 having a diameter of 100 μm through a rotary holder 54. The work table 52 has a known structure capable of moving in x, y, and z directions (i.e., lateral, longitudinal, and vertical directions) in a controlled order.

Figure 27:
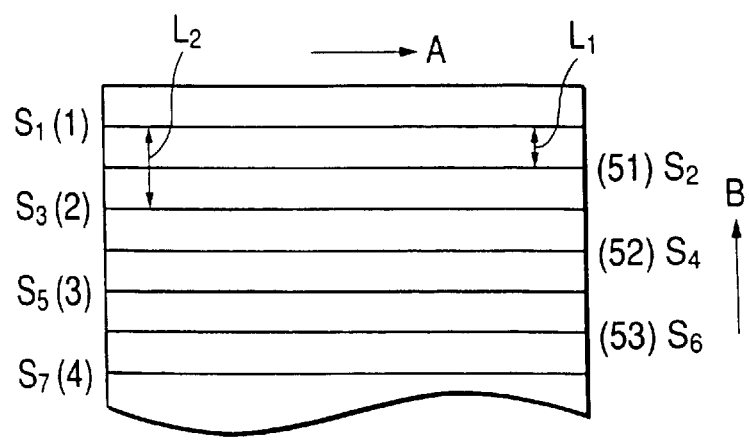
FIG. 27 is an illustration which shows the order in which slots are cut in a die plate according to the fifth embodiment of the invention.

The formation of the slots 2 is achieved in a manner as shown in FIG. 27. Numerals in parentheses indicate the order of formation of the slots 2.

Initially, the first $S_1$ of 100 slots 2 is cut in the direction A. Next, the third $S_3$ is cut at an interval $L_2$ away from the first $S_1$ that is twice a slot pitch $L_1$ of 1.3 mm (i.e., an interval between adjacent two of all the slots 2 formed in the direction A). Thirdly, the fifth $S_5$ is cut at the interval $L_2$. After 50 slots 2 are cut in this manner, the second $S_2$ is cut between the first $S_1$ and the third $S_3$ at the slot pitch $L_1$ away from the first $S_1$. Similarly, the fourth $S_4$, the sixth $S_6$ . . . and the hundredth $S_{100}$ are cut.

After the 100 slots 2 are formed in the direction A, 100 slots 2 are cut in the direction B in the same manner as described above.

The interval $L_2$ is not limited to two times the slot pitch $L_1$ and may be an integral multiple of the slot pitch $L_1$ more than two.

The above cutting operation prevents the cutter 7 from moving in a zigzag direction, that is, from being deformed or shifted, as shown in FIG. 22, out of the required cutting path 79 during cutting of each slot 2. This effect may be thought of as obtained for the following reasons.

When the slots 2 are cut in sequence at the slot pitch $L_1$, each slot 2 is formed while being subjected to reaction forces from two adjacent walls. One of the walls has the thickness corresponding to the slot pitch $L_1$. The other is an unmachined portion of the steel plate 10 and has a greater thickness. The reaction forces from the adjacent walls are, thus, different greatly, thereby resulting in deformation of the cutter 7 during cutting of each slots 2.

In this embodiment, the first half of the slots 2 are formed at the greater pitch $L_2$, and the second half are formed between adjacent two of the first half. The reaction forces acting on the cutter 7 during cutting of each slot 2 are, thus, greatly reduced.

An extrusion die production method according to the sixth embodiment of the invention will be discussed below with reference to FIG. 28 which is different from the fifth embodiment only in that each slot 2 is cut along a line which divides an unmachined portion of the slot forming wall 11 into two equal parts.

Figure 28:
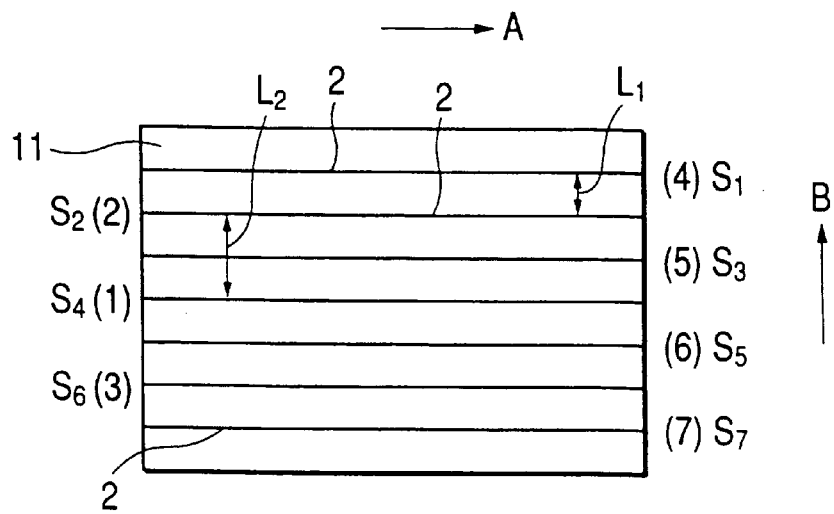
FIG. 28 is an illustration which shows the order in which slots are cut in a die plate according to the sixth embodiment of the invention.

While 100 slots 2 are, similar to the above embodiments, formed in one direction, FIG. 28 illustrates for the case where seven slots 2 are formed in the slot forming wall 11 for the brevity of explanation. Numerals in parentheses indicate the order of formation of the slots 2.

Initially, the fourth $S_4$, or central one of the 7 slots 2 is cut along the lateral center line of the slot forming plate 11. Next, the second $S_2$ of the 7 slots 2 from the top of the slot forming wall 11 is cut along a line defined upward at the interval $L_2$ away from the fourth slot $S_4$, that is, intermediate between an upper end of the slot forming wall 11 and the fourth slot $S_4$. Similarly, the sixth $S_6$ is cut along a line intermediate between the first-cut slot $S_4$ and a lower end of the slot forming wall 11. After the formation of three of the 7 slots 2 is finished, in other words, when it becomes impossible to cut the slots 2 at twice the slot pitch $L_1$ (i.e., the interval $L_1$), the first $S_1$ from the top of the slot forming wall 11 is cut along a line intermediate between the top of the slot forming wall 11 and the second-cut slot $S_2$. Similarly, the third $S_3$, the fifth $S_5$, and the last $S_7$ are cut between the slots $S_2$ and $S_4$, between $S_4$ and $S_6$, and between $S_6$ and the lower end of the slot forming wall 11.

The formation of the slots 2 in the direction B is achieved in the same manner as described above, and explanation thereof in detail will be omitted here.

In the case where an even number of slots 2 are formed, it is impossible to form each slot 2 along a line which divides an unmachined portion of the slot forming wall 11 into two equal parts. In this case, lines along which the slots 2 are to be cut are defined on the slot forming wall 11 at regular intervals (i.e., slot pitches), and each slot 2 is formed along one of the lines closest to the central line of an unmachined portion of the slot forming wall 11.

The formation of the slots 2 of this embodiment minimizes, similar to the above fifth embodiment, the deformation of the cutter 7.

An extrusion die production method according to the seventh embodiment of the invention will be discussed below with reference to FIG. 29.

Figure 29:
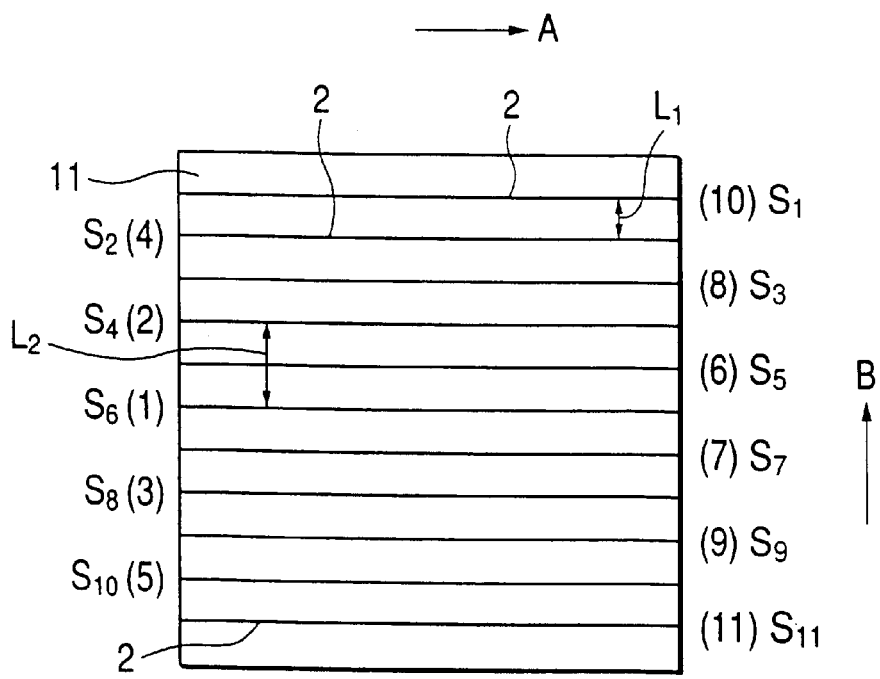
FIG. 29 is an illustration which shows the order in which slots are cut in a die plate according to the seventh embodiment of the invention.

While 100 slots 2 are, similar to the above embodiments, formed in one direction, FIG. 29 illustrates for the case where eleven slots 2 are formed in the slot forming wall 11 for the brevity of explanation. Numerals in parentheses indicate the order of formation of the slots 2.

Initially, the sixth $S_6$, or central one of the 11 slots 2 is cut along the lateral center line of the slot forming plate 11. Next, the fourth $S_4$ from the top of the 11 slots 2 is cut at the interval $L_2$ away from the slot $S_6$. Thirdly, the eighth $S_8$ of the 11 slots 2 from the top of the slot forming wall 11 is cut at twice the interval $L_2$ away from the slot $S_2$ across the slot $S_6$. Similarly, the second $S_2$ and the tenth $S_{10}$ from the top of the slot forming wall 11 are cut at the interval $L_2$ away from the slots $S_4$ and $S_8$. In other words, each of the slots $S_2$ and $S_{10}$ is formed along a line defined at the interval $L_2$ outside one of the two outermost slots 2.

After the formation of five of the 7 slots 2 is finished, in other words, when it becomes impossible to cut the slots 2 at twice the slot pitch $L_1$ (i.e., the interval $L_1$), the fifth $S_5$ from the top of the slot forming wall 11 is cut along a line intermediate between the first-cut slot $S_6$ and the second-cut slot $S_4$. Next, the slots $S_7$, $S_3$, $S_9$, $S_1$, and $S_{11}$ are cut in the illustrated order.

The formation of the slots 2 in the direction B is achieved in the same manner as described above, and explanation thereof in detail will be omitted here.

An extrusion die production method according to the eighth embodiment of the invention will be discussed below with reference to FIG. 30 which is different from the first embodiment in that a tool damage monitoring process is further provided to monitor a tool damage or breakage during cutting of the slots 2 in the steel plate 10.

Figure 30:
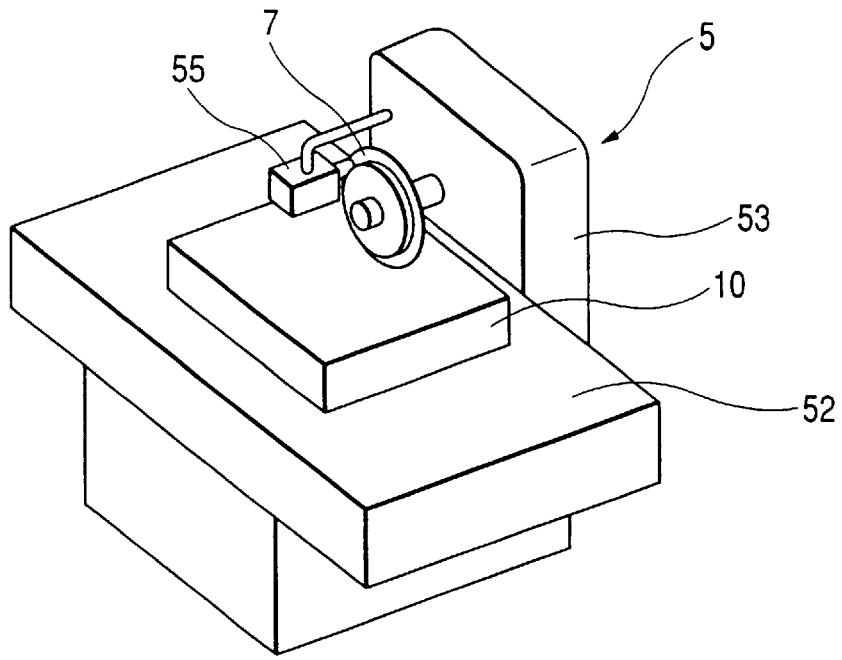
FIG. 30 is a perspective view which shows a grooving machine designed to monitor a service life of a cutter according to the eighth embodiment of the invention.

The grooving machine 5 includes, as shown in FIG. 30, a tool damage monitoring device 55 designed to monitor the breakage of the cutter 7 each time cutting of one slot 2 is completed.

Figure 31:
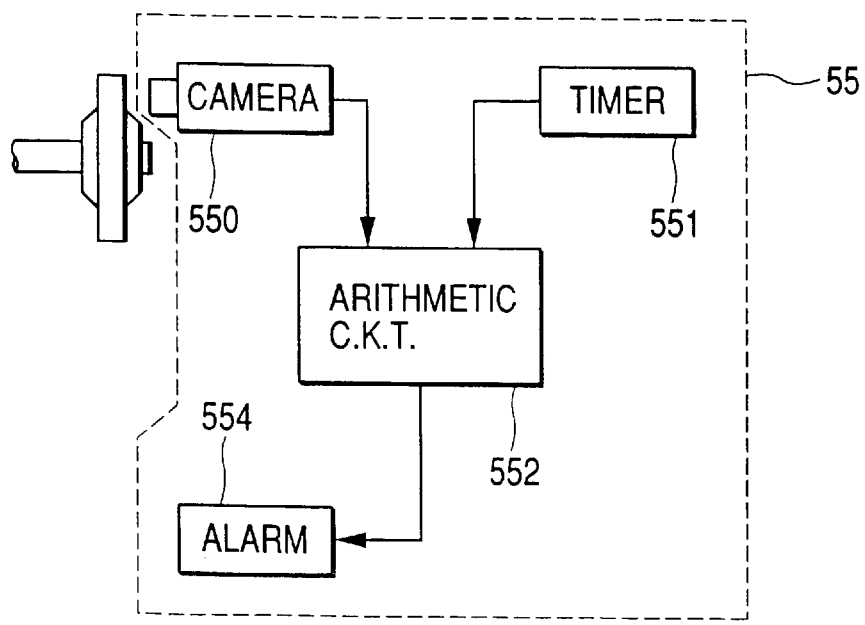
FIG. 31 is a circuit block diagram which shows a tool damage monitoring device mounted on the grooving machine shown in FIG. 30.

The tool damage monitoring device 55, as shown in FIG. 31, consists of a timer 551, an arithmetic circuit 552, a camera 550, and an alarm 554.

Figure 32:
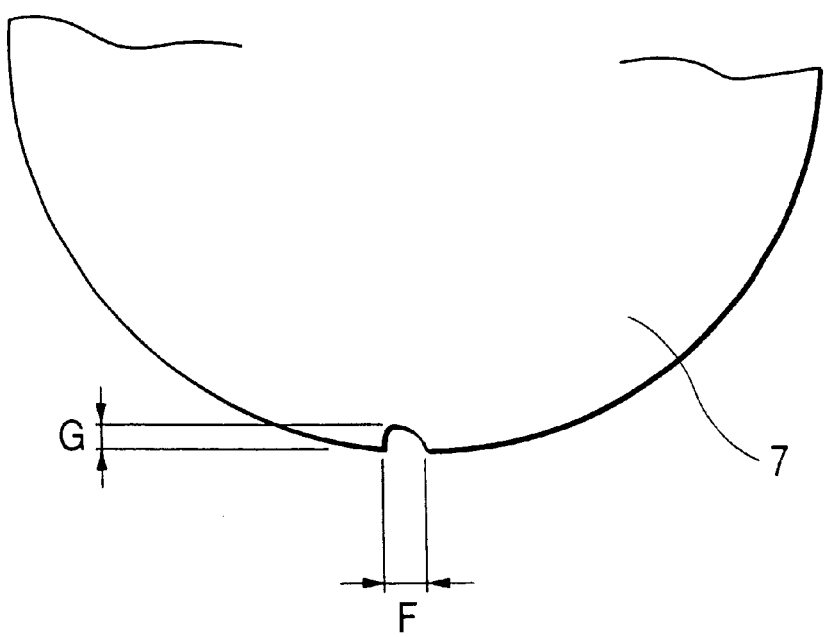
FIG. 32 is an illustration which shows a breakage of a cutter of the grooving machine shown in FIG. 30.

The timer 551 outputs a timing signal to the arithmetic circuit 552 each time the cutting of one slot 2 is completed. The arithmetic circuit 552 is responsive to the inputted timing signal to receive an image of the appearance of the cutter 7 captured by the camera 550 and determines whether the cutter 7 is broken or not. Specifically, the arithmetic circuit 552 determines, as shown in FIG. 32, the number of breakages and the depth G and width F of each breakage and compares them with reference values, receptively.

The reference values of the number of breakage, the depth G, and the width F are, for example, 1, 0.5 mm, and 0.5 mm, respectively. When any of measured parameters is greater than corresponding one of the reference values, the arithmetic circuit 552 determines that the cutter 7 has reached a service life thereof and activates the alarm 554 to urge an operator to replace the cutter 7. This prevents failure in making the honeycomb structure 8 due to a defect of the extrusion die 1 (i.e., the slots 2).

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method of making a molding die comprising the steps of:
   preparing a die material having a slot-forming surface and a molding material feed hole-forming surface opposite the hole forming surface;
   machining a molding material feed hole in the molding material feed hole-forming surface of said die material;
   mounting said die material on a work table of a grooving machine with the molding material feed hole-forming surface exposed to a vacuum chamber provided in the work table; and
   machining a slot, which communicates with the molding material feed hole, in the slot-forming surface of said die material using a rotary disc-shaped cutter having a thickness of 150 $\mu$m or less while decreasing an internal pressure of the vacuum chamber of the grooving machine.

2. A method as set forth in claim 1, wherein said molding die is designed to make a honeycomb structure.

3. A method of making a molding die comprising the steps of:

preparing a die material having a slot-forming surface and a molding material feed hole-forming surface opposite the hole forming surface;

machining molding material feed holes in the molding material feed hole-forming surface of said die material;

mounting said die material on a work table of a grooving machine with the molding material feed hole-forming surface exposed to a vacuum chamber provided in the work table; and machining slots, which communicate with the molding material feed holed, in the slot-forming surface of said die material using a rotary disc-shaped cutter having a thickness of 150 μm or less while decreasing an internal pressure of the vacuum chamber of the grooving machine, said machining step including a masking step of masking at least part of the slots which have already been machined during machining the slots.

4. A method as set forth in claim 3, wherein said molding die is designed to make a honeycomb structure.

5. A method of making a molding die comprising the steps of:

preparing a die material, said die material having a slot-forming surface and a molding material feed hole-forming surface opposite the hole forming surface, the slot-forming surface having formed on an end thereof a tapered portion;

machining a molding material feed hole in the molding material feed hole-forming surface of said die material; and machining a slot, which communicates with the molding material feed hole, in the slot-forming surface of said die material toward the tapered portion using a disc-shaped cutter having a thickness of 150 μm or less so that the cutter may leave the tapered portion at completion of machining the slot.

6. A method as set forth in claim 5, wherein the tapered portion of the slot-forming surface of the die material is so formed that the thickness of the tapered portion is continuously decreased.

7. A method as set forth in claim 6, wherein the tapered portion of the slot-forming surface is inclined at an angle of 18° or less to a reference surface extending in parallel to the slot.

8. A method as set forth in claim 6, wherein the tapered portion is curved.

9. A method as set forth in claim 5, wherein the tapered portion of the slot-forming surface of the die material is so formed that the thickness of the tapered portion is decreased stepwise.

10. A method as set forth in claim 5, wherein said molding die is designed to make a honeycomb structure.

11. A method of making a molding die comprising the steps of:

preparing a die material having a slot-forming surface and a molding material feed hole-forming surface opposite the hole forming surface;

machining molding material feed holes in the molding material feed hole-forming surface of said die material; and machining slots which communicate with the molding material feed holes in the slot-forming surface of said die material in sequence at regular pitches using a rotary cutter having a thickness 150 μm or less, each of the slots being formed at an interval two times the regular pitch or more away from immediately preceding one of the slots.

12. A method as set forth in claim 11, wherein the interval is 2.0 mm or more.

13. A method as set forth in claim 11, wherein each of the slot is cut close to a line which divides an machined portion of the slot-forming surface into two equal parts.

14. A method as set forth in claim 11, further comprising a cutter damage monitoring step of monitoring breakage of the rotary cutter during machining of the slots to determine whether the cutter has reached a service life thereof or not.

15. A method as set forth in claim 12, said cutter damage monitoring step determines the number of breakages, the depth of each breakage, and the width of each breakage and compares them with reference values in determining whether the cutter has reached the service life or not.

16. A method as set forth in claim 15, wherein the reference values of the number of breakage, the depth of each breakage, and the width of each breakage is 1, 0.5 mm, and 0.5 mm, respectively.

17. A method as set forth in claim 11, wherein said molding die is designed to make a honeycomb structure.

* * * * *